United States Patent [19]

Zimmermann

[11] Patent Number: 5,472,071
[45] Date of Patent: Dec. 5, 1995

[54] SHOCK-ABSORBING STRUT FOR HYDRAULIC WHEEL-DRIVE UNIT

[75] Inventor: Horst Zimmermann, Bludenz, Austria

[73] Assignee: Krupp Industrietechnik Gesellschaft mit beschränkter Haftung, Essen, Germany

[21] Appl. No.: 211,006

[22] PCT Filed: Sep. 2, 1992

[86] PCT No.: PCT/EP92/02024

§ 371 Date: Mar. 11, 1994

§ 102(e) Date: Mar. 11, 1994

[87] PCT Pub. No.: WO93/05969

PCT Pub. Date: Apr. 1, 1993

[30] Foreign Application Priority Data

Sep. 21, 1991 [DE] Germany .......................... 41 31 545.6

[51] Int. Cl.⁶ .................................................... F16F 9/22
[52] U.S. Cl. .................. 188/322.11; 188/322.19; 267/119; 267/126
[58] Field of Search .................... 188/285–289, 188/312, 315, 318, 322.19, 322.11, 321.11; 267/64.16, 64.17, 64.26, 119, 126

[56] References Cited

U.S. PATENT DOCUMENTS 3,008,424  11/1961  Roth ............................ 103/121
3,391,921   7/1968  Axthammer ................... 267/64.17
3,476,354  11/1969  Stubblefield ................. 267/64.16
3,567,244   3/1971  Hoffman et al. .............. 267/64.16
4,220,352   9/1980  Umeda et al. ................. 280/708
4,887,515  12/1989  Tabata .......................... 188/315

FOREIGN PATENT DOCUMENTS 330555    7/1976  Austria .
0331101   9/1989  European Pat. Off. .
0332020   9/1989  European Pat. Off. .
3743203A1 7/1989  Germany .
2224983   5/1990  United Kingdom .

Primary Examiner—Robert J. Oberleitner
Assistant Examiner—Chris Schwartz
Attorney, Agent, or Firm—Herbert Dubno

[57] ABSTRACT

A shock-absorbing strut in which fluid passages extend through the strut to communicate with a hydraulic wheel drive of the wheel assembly to which a movable part of the strut is affixed. Telescoping connectors are provided between the outer guide housing affixed to the vehicle frame and a revolving joint in the axially movable support element and compensating cylinders are provided to balance the hydraulic pressure on the revolving joint resulting from the pressure in the telescoping connectors of the oil feed to the wheel drive.

6 Claims, 3 Drawing Sheets

SHOCK-ABSORBING STRUT FOR HYDRAULIC WHEEL-DRIVE UNIT

CROSS REFERENCE TO RELATED APPLICATIONS

This application is a national phase of PCT/EP92/02024 filed Sep. 2, 1992 and based, in turn, on German national application P 41 31 545.6 filed Sep. 21, 1991 under the International Convention.

FIELD OF THE INVENTION

The invention relates to a shock-absorbing strut with an outer guide housing fixed to a vehicle frame, a support element axially slidable and rotatable within the housing for receiving a wheel carrier and provides with hydraulic wheel drive, at least one surge chamber formed by the guide housing and the support element and/or members rigidly connected therewith, in order to brace the chassis with respect to the wheel or a group of wheels and with an oil supply system having an oil feed and an oil return for the hydraulic wheel drive.

BACKGROUND OF THE INVENTION

A shock-absorbing strut is known from Austrian Patent 330 555. Instead of one wheel, the support element can thereby be supported on a group of wheels, as is known from U.S. Pat. No. 4,220,352.

It is further known to supply the hydraulic drive motor with pressure oil via flexible hoses suspended on steerable rocker arms and via hydraulic cylinders supported against the frame of the wheels or wheelset, these hoses running outside the mentioned parts. However in this type of arrangement, especially in a limited space such as in heavy vehicles, particularly in vehicle-mounted cranes, there is the disadvantage of damage possible to and short life of the hoses.

OBJECT OF THE INVENTION

It is the object of the invention to provide a shock-absorbing strut wherein the mentioned drawbacks are avoided and the oil supply for the hydraulic drive is safe, reliable and durable.

SUMMARY OF THE INVENTION

This object is achieved, according to the invention, in that the oil feed line and oil return line run through the shock-absorbing strut, that the oil feed line and the oil return line each have a sealed telescopic connector, whereby a line of each connector is rigidly connected to the guide housing, that the telescopic connectors which are axially movable with respect to the guide housing are connected to a revolving joint which is axially and nonslidably connected with the support element, that the ends facing away from the guide housing of the oil feed line and the oil return line are located in the external part of the revolving joint which is rotationally rigidly connected with the support element and that the telescopic line connectors are each connected with a compensation cylinder, wherein the hydraulic pressure of the hydraulic oil provided for the drive exerts a force on the revolving joint which corresponds to the force exerted in the telescopic line connector, but in the opposite direction.

The fact that the oil feed line and the oil return line pass through the stably designed shock-absorbing strut precludes damage inflicted by external influences. Inside each shock-absorbing strut an axially adjustable telescopic line connector and a revolving joint are provided. Due to these two line connections a firm connection on the shock-absorbing strut is established both with respect to the chassis and, on the other hand, with respect to the foot of the support element and thereby with respect to a hydraulic wheel drive. In order to make sure that the effective frontal surfaces, always present in the telescopic connectors when a hydraulic pressure exits for the drive, have no influence on the support of the shock-absorbing strut, the telescopic line connectors are each connected to a cylinder wherein the hydraulic pressure exerts a force on the revolving joint and thereby on the support element and the wheel, respectively wheel group, which corresponds to the force exerted in the telescopic line connector, but acts in the opposite direction. The total influence of hydraulic pressure for the drive is zero with respect to the support.

The compensation cylinder can have a cylinder housing which is preferably immobile with respect to the guide housing and a piston which is connected via its piston rod with the revolving joint. The cylinder chamber of the compensation cylinder facing the revolving joint is thus hydraulically connected with the respectively assigned telescopic line connector. In order to balance the opposite force effects of the hydraulic pressure, the difference between the square of the inner diameter of the compensation cylinder and square of the piston rod diameter is equal to the square of the largest inner diameter of the telescopic line connector.

The hydraulic connection between the telescopic line connector and the compensation cylinder is preferably achieved through a channel arranged in the upper cover of the revolving joint and the piston rod of the balance cylinder. No function is related to the peripheral surface of the upper cover, so that it can be used to form a corresponding channel.

The line of the telescopic connector directed towards the revolving joint and the piston rod of the balance cylinder together with the upper cover of the revolving joint are rotationally immobile with respect to the guide housing.

In order to make sure that these parts are free of transverse forces, particularly during the steering of a wheel or group of wheels, it is provided that the upper cover and the inner part of the revolving joint be kept rotationally immovable with respect to the guide housing by means of a torque converter bearing. The torque converter bearing preferably has a spline connection, whereby the external spline and the internal spline are formed by a part fastened to the guide housing and a part fastened to the revolving joint. Splined shaft and serrated shaft connections can be considered equivalent to the spline connection.

The hydraulic connection between the telescopic line connector and the end of the oil feed line and the oil return line facing away from the guide housing is preferably achieved by each of the following: a passage hole in the upper cover, a blind hole and a radial passage in the inner part of the revolving joint, an annular groove in the inner part or the outer part of the revolving joint, a radial passage and an axial blind hole in the outer part of the revolving joint.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
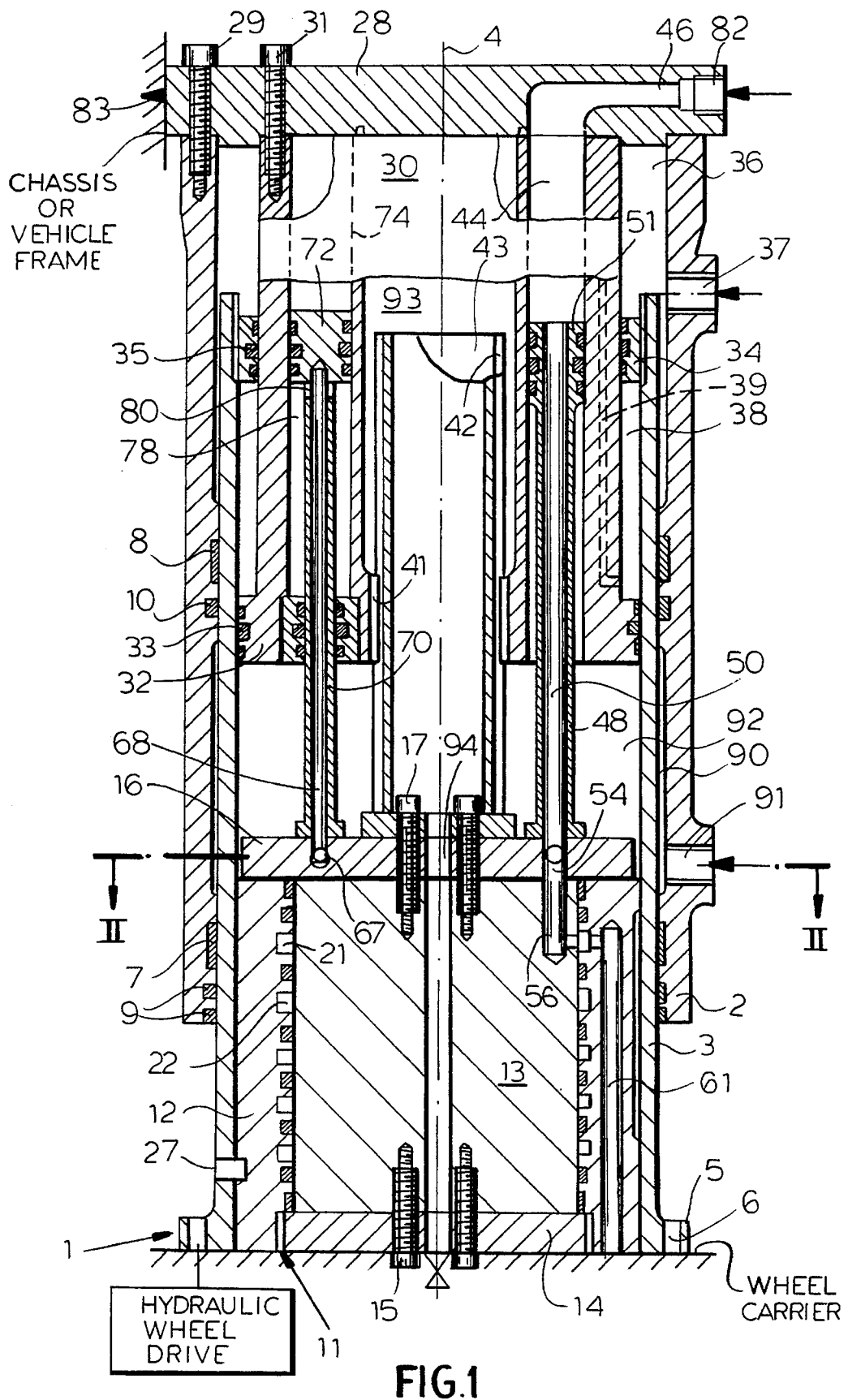
FIG. 1 is an axial cross sectional view of a shock-absorbing strut along the line I—I in FIG. 2.

The shock-absorbing strut 1 (FIG. 1) has an outer sleeve or guide housing 2, which is firmly connected with a chassis or vehicle frame. In the outer sleeve 2 a tubular guide or support element is movably supported, namely longitudinally slidable in the direction of the strut axis 4 as well as swingable about axis 4 by an angle of a maximum of 90°.

The swingability of tubular guide 3 is performed by a steering as described in EP-A2-0 332 020. At its lower end projecting from the outer sleeve 2, the tubular guide 3 has a flange 5 with holes 6. A wheel carrier is screwed to this flange 5, as is also disclosed in EP-A2-0 332 020. A hydraulic motor as disclosed for instance in the DE-OS 26 23 757 as a single-wheel drive is built into the wheel carrier or into the wheel hub supported by it.

The forces acting perpendicularly to the strut axis 4 from the wheel upon the shock-absorbing strut 1 are transmitted by the tubular guide 3 over slip rings 7, 8 to the outer sleeve 2. Under each slip ring 7, 8 sealing rings 9, 10 are arranged.

The shock-absorbing strut 1 has further a rotary transmission leadthrough or a revolving joint 11. This consists of a tubular outer part 12, a cylindrical inner part 13-rotatable with respect to the outer part 12, a lower cover 14 firmly connected by screws 15 to the inner part 13, as well as an upper cover 16, which is also firmly connected by screws 17 to the inner part 13. The outer diameter of both covers 14, 16 is larger than the inner diameter of the outer part 12. The inner part 13 thus can rotate with respect to the outer part 12, but in axial direction, i.e. in the direction of the strut axis 4, the inner part 13 is immovable with respect to the outer part 12, which is engaged between the covers 14, 16.

The outer part 12 has slip rings 18, 19 (FIG. 3) at the top and the bottom of its inner wall. Between the slip rings 18, 19 annular grooves 21 to 25 are formed one under the other in the inner wall. Between these grooves and between the two outer grooves 21, 25 and the slip rings 18, 19 a sealing ring 26 is arranged in each case.

The outer part 12 is slid from below into the tubular guide 3 and is secured against rotation as well against as longitudinal displacement with respect to the guide by pins 27.

The shock-absorbing strut 1 is covered on top by a cover 28 (FIG. 1) which is firmly connected to the outer sleeve 2 by screws 29. A hollow piston rod 30 built like a thick-walled tube is also securely fastened to the cover 28 by screws 31. The piston rod 30 has at its lower end an annular attachment forming the piston 32, in which a seal 33 is embedded.

At the upper end of the tubular guide 3 there is a guide bushing 34 firmly connected to the guide for instance by screws and having a seal 35.

The annular chamber 36 defined by cover 28, the outer sleeve 2, the piston rod 30, the upper end of the tubular guide 3 and guide bushing 34 forms the main pressure chamber of the shock-absorbing strut 1 with reference to the support of the vehicle on the wheel. It is connected via connection 37 and a throttle arrangement, for the purpose of vibration damping, with a pressure reservoir connected to a pressure source, as disclosed for instance in EP-A-0 331 101.

Thereby the active piston surface, which is decisive for the support force of the hydropneumatic shock-absorbing system, is formed by the end surfaces of the tubular guide 3 and the guide bushing 34.

The annular chamber 38 defined by the tubular guide 3, the piston rod 30 and the piston 32 and the guide bushing 34 is also a component of the hydropneumatic shock-absorbing system. In this annular chamber ends a line 39 running axially through the piston 30 and exiting shortly before the piston 32. Through this line the annular chamber 38 can be connected with any pressure source for instance for lifting the wheel or for directly fixing the height of the wheel with respect to the chassis, i.e. by disconnecting the hydroreservoir from the annular chamber 36 (due to the different cross section surface no equalizing of the pressure oil takes place).

The hollow piston rod 30 has at the lower end of its inner wall an internal spline 41, which is in engagement with the external spline 42 of a tubular torque member 43. The torque member 43 is firmly connected with flange 45 (FIG. 3) located at its lower end with the cover 16 and the inner part 13 of the revolving joint 11 by means of screws 17 and insures this way that the upper cover 16, the inner part 13 of the of the revolving joint 11 and the lower cover 14 as a subunit of the revolving joint 11 cannot perform any rotary motion with respect to the piston rod 30 and the outer sleeve 2.

Figure 2:
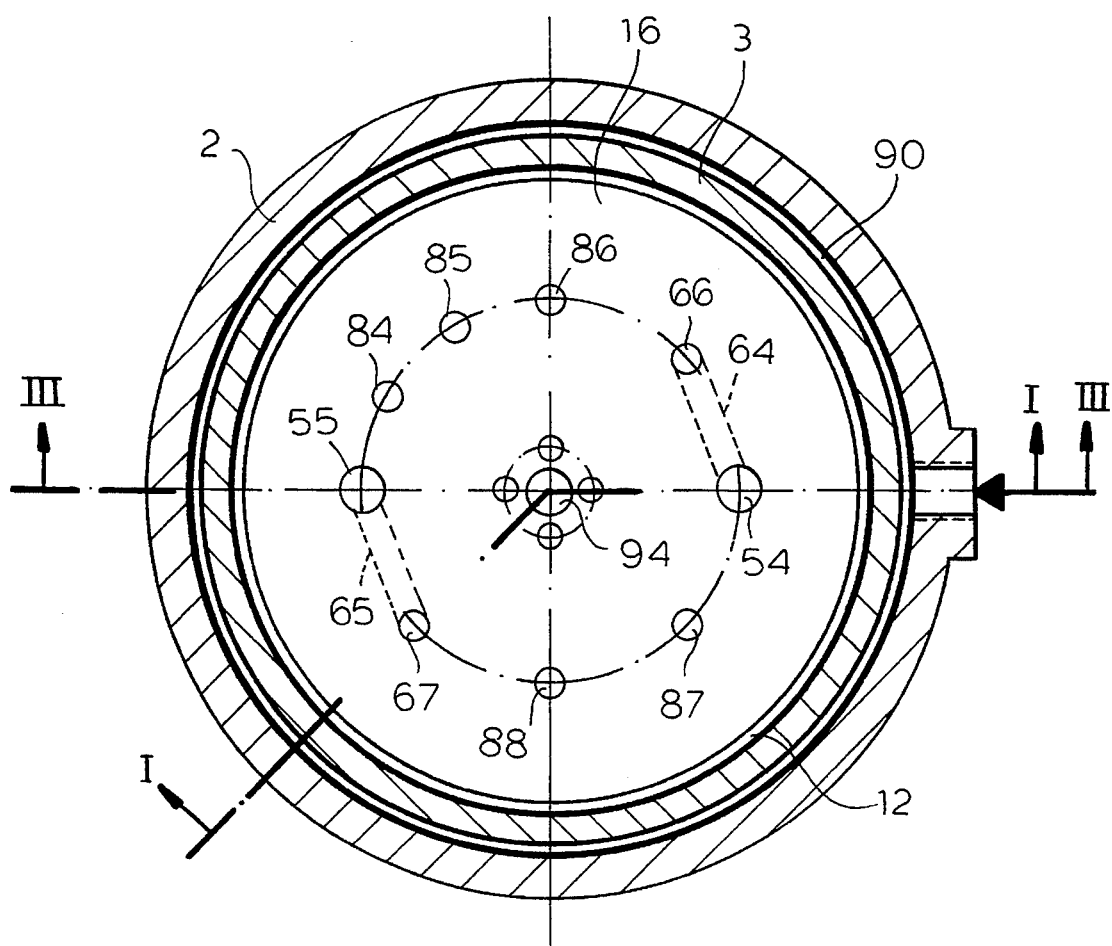
FIG. 2 is a transverse section through the shock-absorbing strut along the line II—II in FIG. 1.

In the piston rod 30 two diametrically opposed bores 44 are provided (In FIG. 1 only one of them can be seen because of the section line I—I in FIG. 2). Both bores 44 are in communication with the channels 46 in the cover 28. Into these bores 44 project the piston rods 48 and (compare to FIG. 3) 49 with inner bores 50, whose upper ends are designed as annular pistons 51 with seals. The piston rods 48, 49 are fastened to the upper cover 16 for instance with screws.

Figure 3:
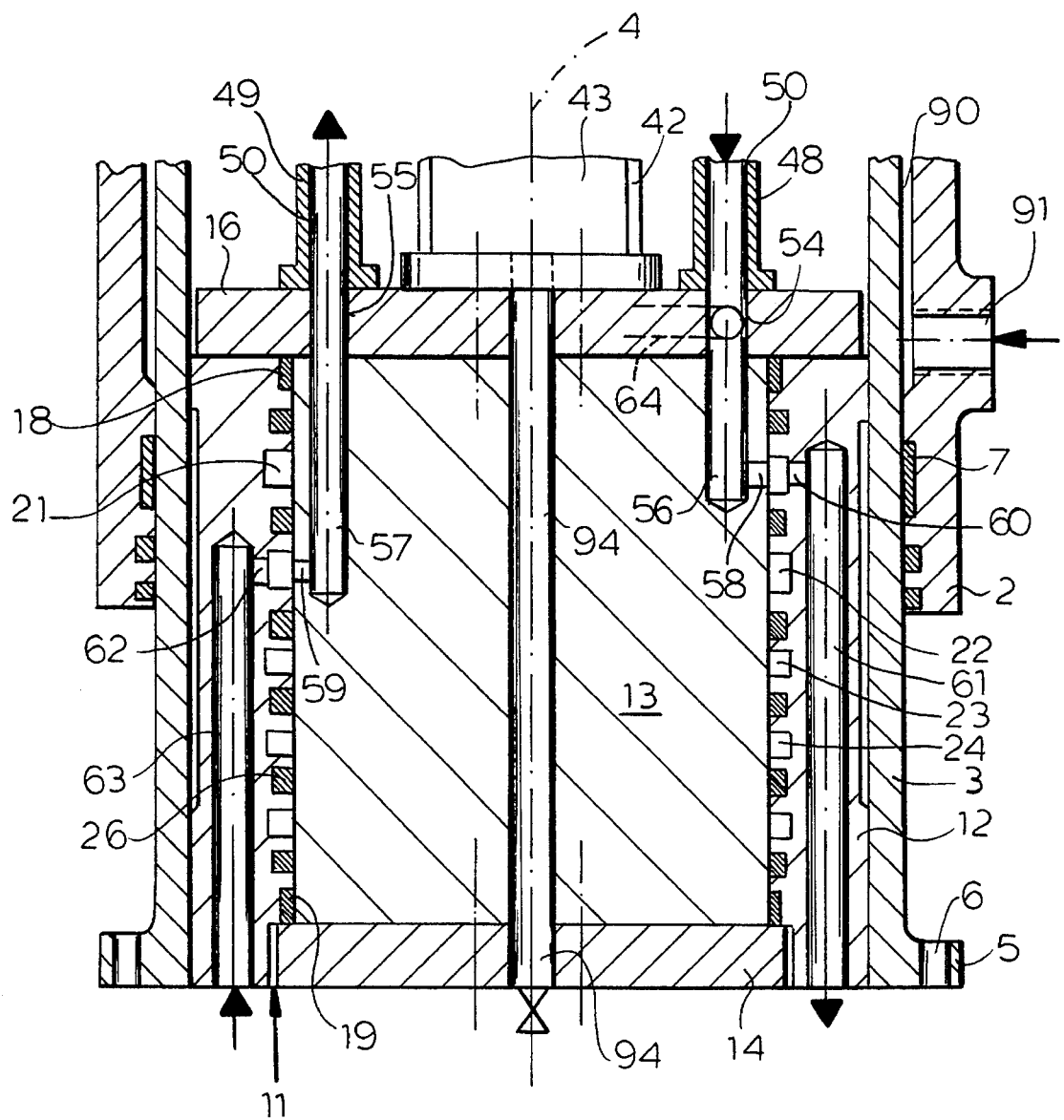
FIG. 3 is a section through the shock-absorbing strut along line III—III drawn to FIG. 2, in an enlarged scale.

At the spot where the piston rods 48, 49 are fastened, the cover 16 has throughgoing bores 54, 55 (FIG. 3) and the inner part 13 of the revolving joint 11 has corresponding blind bores 56, 57. One of the blind bores 56 is connected at the level of the inner groove 21 with a channel 58 opening towards the outside (FIG. 3). The further bore 57 diametrically opposed with respect to the strut axis 4 is also connected at the level of inner groove 22 in the same manner with a channel 59 opening towards the outside.

The inner groove 21 is connected through a passage 60 with a downwardly open channel 61 running in the outer part 12 parallel to the strut axis 4. The inner groove 22 is connected through a passage 62 with a corresponding channel 63 in the outer part 12.

The throughgoing bores 54, 55 are each connected via a channel 64, 65 (FIG. 2) with upwardly open blind bores 66, 67 located on the same circumference (shown by a dot-dash line in FIG. 2). At the location of each of these bores a hollow piston rod 70 provided with an inner bore 68 (FIG. 1) is firmly connected with the cover 16, for instance by screws. The upper end of piston rods 70, designed as pistons 72 with seals, run in respective cylindrical bores 74 of the piston rod 30.

The bores 74 are closed off downwards by guide bushings 76 at the level of the piston 32 (FIG. 1). The guide bushings 76 are fastened in the piston rod 30 by threading and have seals at its inner walling wherein the piston rods 70 are slidably guided. The bores 74, the pistons 72, the guide bushings 76 and the piston rods 78 form a cylinder chamber 78 of a pressure-compensation cylinder, which through bores 80 in the piston rod 70, the inner bore 68, the bore 66 or 67, the channel 64 or 65 and the bore 54 or 55 is connected on the one hand with the inner bore 50 of the piston rods 48 or 49 and on the other hand with the bores 61 or 63 in the outer part 12.

The dimensions of bores 44 and 74 and of the piston rods 70 are such that $$d^2_{44} = d^2_{74} - d^2_{70}$$

whereby $d_{44}$=inner diameter of bores 44

$d_{74}$=inner diameter of bores 74

$d_{70}$=outer diameter of piston rods 70.

In this way the area defined by the inner diameter of bores 44 is just as large as the effective cross-sectional area of chambers 78.

A hydraulic pressure in bore 44 exerts upon the revolving joint and thereby also upon the tubular guide 3 a force directed away from the cover 28. The same pressure in the chamber 78 of the compensation cylinder acts on the revolving joint 11 via piston 72 and the piston rod 68 due to the same effective piston surface exert a force of equal magnitude but oppositely directed on the revolving joint 11. The pressure of the pressure oil provided for the drive of the hydraulic motor has therefore no influence on the action of the shock-absorbing strut 1 as a spring support element.

The reverse happens during spring deflection of the shock-absorbing strut when pressure oil with the same pressure is received in the chamber 78 which is getting larger, while at the same time pressure oil escapes from the bore which is getting smaller.

Therefore in the shock-absorbing strut 1 two hydraulic systems are contained, which are fully separated from each other and do not influence each other, one for the cushioned support and another for the supply to the drive member.

The hydraulic oil required for the drive of the hydraulic motor is supplied to the shock-absorbing strut 1 via a connection 82 in the cover 28. The supply flow of the hydraulic oil to the hydraulic motor takes place through channel 46 in the cover 28, the bore 44 in the piston rod 30, the inner bore 50 in the piston rod 48, the bore 54 in the cover 16 (at simultaneous pressure actuation of chamber 78 of the compensation cylinder through channel 64), the bore 56 and the channel 58 in the inner part 13, the annular groove 21, the passage 60 and the bore 61 in the outer part 12. The return flow of the hydraulic oil from the hydraulic motor takes place correspondingly through the bore 63 and the passage 62, the annular groove 22, the channel 59 and the bore 57, the throughgoing bore 55 (with simultaneous pressure actuation of chamber 78 of the other compensation cylinder through channel 65 and the bore 67 in the cover 16), the piston rod 49, a bore corresponding to bore 44 seen in FIG. 1 and a channel corresponding to the illustrated channel 46 leading to outlet 83.

In FIG. 2 in the cover 16 further bores 84 to 88 are indicated for steering oil, waste oil, and air. These are components of line systems, which like the bores 44—but without the described pressure compensation—are connected via annular grooves 23 to 25 with a bore comparable to bore 61.

A lubrication chamber 90 provided in the outer sleeve 2 is supplied with lubricant through at least one connection 91.

The inner spaces 92 and 93, which are not further described, around the torque member 43 and inside the piston rod 30 are in contact with the atmosphere through the central bore 94 extending through the entire revolving joint 11.

I claim:

1. A shock absorbing strut, comprising:

an outer guide housing affixed to a vehicle frame;

a support element rotatable about a strut axis and axially slidable in said outer guide housing and affixed to a wheel carrier having a hydraulic wheel drive;

means forming at least one pressure chamber between said support element and said outer guide housing for bracing said vehicle frame relative to said wheel carrier;

fluid-passage means forming an oil feed line running from said outer guide housing through said strut to said hydraulic wheel drive and an oil return line running through said strut from said hydraulic wheel drive to said outer guide housing for operating said drive, said fluid passage means including:

respective sealed telescoping connectors parallel to said axis and disposed between said outer guide housing and said support element for each of said oil feed line and said oil return line, a revolving joint in said support element connected to said telescoping connectors, said revolving joint having a first member axially slidable but nonrotatable relative to said housing and communicating with said telescoping connectors, and a second member rotatable with said support element but axially fixed relative to said first member, said second member being formed with ends of said lines remote from said outer guide housing, and means forming a compensation cylinder connected to said revolving joint for exerting a force thereon equal to and opposite to a force exerted on said revolving joint by hydraulic pressure of oil for operating said drive and passing through said telescoping connectors.

2. The shock-absorbing strut defined in claim 1 wherein said compensation cylinder has a cylinder housing fixed to said guide housing, and a piston connected by a piston rod with said revolving joint, said compensation cylinder having a cylinder chamber facing toward said revolving joint and connected with a respective telescoping connector, a difference between the square of a center diameter of the cylinder and the square of the diameter of the respective piston rod being equal to the square of the largest inner diameter of the respective telescoping connector.

3. The shock-absorbing strut defined in claim 2 wherein a hydraulic connection is effected between the respective telescoping connector and said cylinder through a channel in an upper cover of said revolving joint and a channel in said piston rod.

4. The shock-absorbing strut defined in claim 1 wherein said revolving joint is formed with an upper cover connected to said guide housing through a torque member.

5. The shock-absorbing strut defined in claim 4 wherein said torque member has a spline connection with an external spline and an internal spline connecting said torque member to said outer guide housing.

6. The shock-absorbing strut defined in claim 1 wherein a hydraulic connection is formed between said revolving joint and said telescoping connectors through passages in an upper cover of said revolving joint, blind holes in said first member, radial passages in said first member connected with said blind holes, grooves formed between said members, radial passages connected to said grooves and axial blind holes in said first member of said revolving joint.

\* \* \* \* \*